(12) United States Patent
Giles et al.

(10) Patent No.: US 8,396,053 B2
(45) Date of Patent: Mar. 12, 2013

(54) METHOD AND APPARATUS FOR VLAN-BASED SELECTIVE PATH ROUTING

(75) Inventors: James Ryan Giles, Yorktown Heights, NY (US); Rohit Wagle, Elmsford, NY (US); Xiaolan J. Zhang, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 12/108,861

(22) Filed: Apr. 24, 2008

(65) Prior Publication Data
US 2009/0268737 A1    Oct. 29, 2009

(51) Int. Cl.
*H04L 12/66* (2006.01)
*H04L 12/28* (2006.01)
*H04L 12/56* (2006.01)

(52) U.S. Cl. .............. 370/352; 370/392; 370/395.53

(58) Field of Classification Search .............. None
See application file for complete search history.

(56) References Cited

U.S. PATENT DOCUMENTS

| | | | |
|---|---|---|---|
| 6,085,238 A * | 7/2000 | Yuasa et al. ................ 709/223 |
| 6,944,130 B1 * | 9/2005 | Chu et al. .................. 370/238.1 |
| 7,154,861 B1 * | 12/2006 | Merchant et al. ............. 370/254 |
| 7,231,430 B2 | 6/2007 | Brownell et al. |
| 7,428,237 B1 * | 9/2008 | Gai et al. ................. 370/395.53 |
| 7,463,588 B1 * | 12/2008 | Tanaka et al. ............... 370/238 |
| 7,734,175 B2 * | 6/2010 | Amemiya et al. ............ 398/45 |
| 2005/0078685 A1 * | 4/2005 | MacLean et al. ........ 370/395.54 |
| 2005/0259646 A1 * | 11/2005 | Smith et al. .................. 370/389 |
| 2006/0029072 A1 * | 2/2006 | Perera et al. ................. 370/389 |
| 2006/0072554 A1 * | 4/2006 | Farahmand et al. .......... 370/352 |
| 2007/0280686 A1 * | 12/2007 | Amemiya et al. ............... 398/51 |
| 2008/0247394 A1 * | 10/2008 | Kadambi et al. .............. 370/392 |
| 2008/0291822 A1 * | 11/2008 | Farkas et al. .................. 370/216 |
| 2009/0257751 A1 * | 10/2009 | Sadananda et al. ............. 398/83 |

OTHER PUBLICATIONS

T. Otsuka, M. Koibuchi, A. Jouraku, H. Amano, "VLAN-based Minimal Paths in PC Cluster with Ethernet on Mesh and Torus", In Proc. of the 2005 International Conference on Parallel Processing (ICPP-05), pp. 567-576, Jun. 2005.*

X. Zhang, R. Wagle, J. Giles, "VLAN-based Routing Infrastructure for an All-Optical Circuit Switched LAN", IEEE Globecom 2009, RC24828 (W0907-056), Jul. 2009.*

K.J. Barker et al., "On the Feasibility of Optical Circuit Switching for High Performance Computing Systems," Proc. of the ACM/IEEE SC Conference, Nov. 2005, pp. 1-22, Washington.

* cited by examiner

*Primary Examiner* — Gregory Sefcheck
*Assistant Examiner* — Suk Jin Kang
(74) *Attorney, Agent, or Firm* — Ryan, Mason & Lewis, LLP

(57) ABSTRACT

An illustrative embodiment of the present invention includes a method for routing at least one packet from at least one source node to at least one destination node, each node is operatively coupled to a given packet switch within a plurality of packet switches operatively coupled to a given circuit switch. The method includes a step of establishing one or more Virtual Local Area Networks (VLANs). Each VLAN comprising a subset of the plurality of packet switches operatively coupled to the given circuit switch. At least one of the one or more VLANs comprises the at least one packet switch to which the source and destination nodes are operatively coupled. The method also includes a step of routing the at least one packet from the source node to the destination node over at least one loop-free path comprised of one or more packet switches within a given VLAN.

25 Claims, 3 Drawing Sheets

600

METHOD AND APPARATUS FOR VLAN-BASED SELECTIVE PATH ROUTING

The invention disclosed herein was made with U.S. Government support under Contract No H98230-07-C-0383 awarded by the U.S. Department of Defense. The Government has certain rights in this invention.

FIELD OF THE INVENTION

The present invention relates to networking systems. More particularly, the present invention relates to methods and apparatus for selective path routing of data.

BACKGROUND OF THE INVENTION

Recent literature has described a reconfigurable network topology amenable to evolving data workloads such as stream processing. For example, K. J. Barker et al., *On the Feasibility of Optical Circuit Switching for High Performance Computing Systems*, Proceedings of the ACM/IEEE SC 2005 Conference, the disclosure of which is incorporated by reference herein, describes a network topology that combines the flexibility and power savings of Optical Circuit Switches, with an aggregation scheme whereby several nodes are connected to one of several Electrical Packet Switches, and each Electrical Packet Switch is connected to the Optical Circuit Switch. The Optical Circuit Switch can be dynamically reconfigured as bandwidth needs evolve to connect one or more ports of each Electrical Packet Switch to one or more ports on other Electrical Packet Switches. In this way, data can be sent from a node, aggregated with traffic from other nodes at their packet switch, routed through the Optical Circuit Switch which is dynamically configured to connect packet switches together that need the highest bandwidth, and routed through the target Electrical Packet Switch and then demultiplexed to target nodes. However, the technique described in the Barker paper for routing through the reconfigurable network to maximize network utilization is dependent on the development of new communication protocols—there is no support for existing network protocols, such as Transmission Control Protocol/Internet Protocol (TCP/IP).

To route protocols such as TCP/IP through the reconfigurable network while attempting to maximize the network utilization, there are a few well-known options. For example, standard network routing on Layer 2 involves the use of a default LAN and setup spanning tree group on that LAN to remove loops. The source node can send data to the destination on the default LAN. The primary disadvantage of this approach is that some links will be disabled by the spanning tree algorithm resulting in significantly reduced network link utilization. Additionally, the spanning tree protocol may take seconds to converge for each topology reconfiguration.

Another approach involves source routing, in which the whole route is stored in each packet header and a switch will route the packet according to the path specified in the header. The primary disadvantage of this approach is that an additional protocol needs to be implemented on the packet switch and nodes to do source routing. The route through the network has to be communicated to the origin so that it can be included in the packet. Additionally, packet size increases as network size and complexity increases.

Virtual circuit routing may be used in which, after each topology reconfiguration, virtual circuits are setup between chassis for routing. The disadvantage of this approach is that it requires dynamic virtual circuit assignment at the packet switch for each route after each reconfiguration. This requires that the packet switch have virtual circuit support at external ports; most switches do not have this capability.

Virtual local area networks (VLANs) have been employed to create a logical separation on a shared physical local area network VLANs have also been used to provide a primary and backup network for fail-over situations. For example, U.S. Pat. No. 7,231,430, the disclosure of which is incorporated by reference herein, teaches the use of reconfigurable VLANs to partition a computer cluster for different virtual services accessed by an external network.

SUMMARY OF THE INVENTION

An illustrative embodiment of the present invention includes a method for routing at least one packet from at least one source node to at least one destination node, each node is operatively coupled to a given packet switch within a plurality of packet switches operatively coupled to a given circuit switch. The method includes a step of establishing one or more Virtual Local Area Networks (VLANs). Each VLAN comprising a subset of the plurality of packet switches operatively coupled to the given circuit switch. At least one of the one or more VLANs comprises the at least one packet switch to which the source and destination nodes are operatively coupled. The method also includes a step of routing the at least one packet from the source node to the destination node over at least one loop-free path comprised of one or more packet switches within a given VLAN.

These and other objects, features and advantages of the present invention will become apparent from the following detailed description of illustrative embodiments thereof, which is to be read in connection with the accompanying drawings.

DETAILED DESCRIPTION

In an illustrative embodiment, the present invention employs VLAN technology, which has been traditionally used for network separation, in a selective path routing of streaming data in a dynamically circuit switched network. An illustrative embodiment provides a Virtual Local Network (VLAN) and trunking-based solution for source routing at Internet layer 2 on a network consisting of nodes connected to edge Electrical Packet Switches which are in turn connected to each other through an Optical Circuit Switch. Each Electrical Packet Switch and its directly attached nodes may be considered as a cluster. Preferably, a unique VLAN is established for each subset of clusters. These VLANs describe routes between one cluster and another cluster that, depending on the manner that the Optical Circuit Switch is configured, might be a direct connection or might traverse the Electrical Packet Switches in additional clusters.

To send data from a source node in a cluster to a destination node in another cluster, the source node addresses the data to the destination node using the IP address of the destination node on the VLAN that describes the desired route. The availability of routes is dynamically determined by reconfigurable network topology. In most cases, the route is a direct connection between the source and destination Electrical Packet Switches through the Optical Circuit Switch, however, additional paths through intermediate cluster Electrical Packet Switches may be available under certain conditions.

Figure 1:
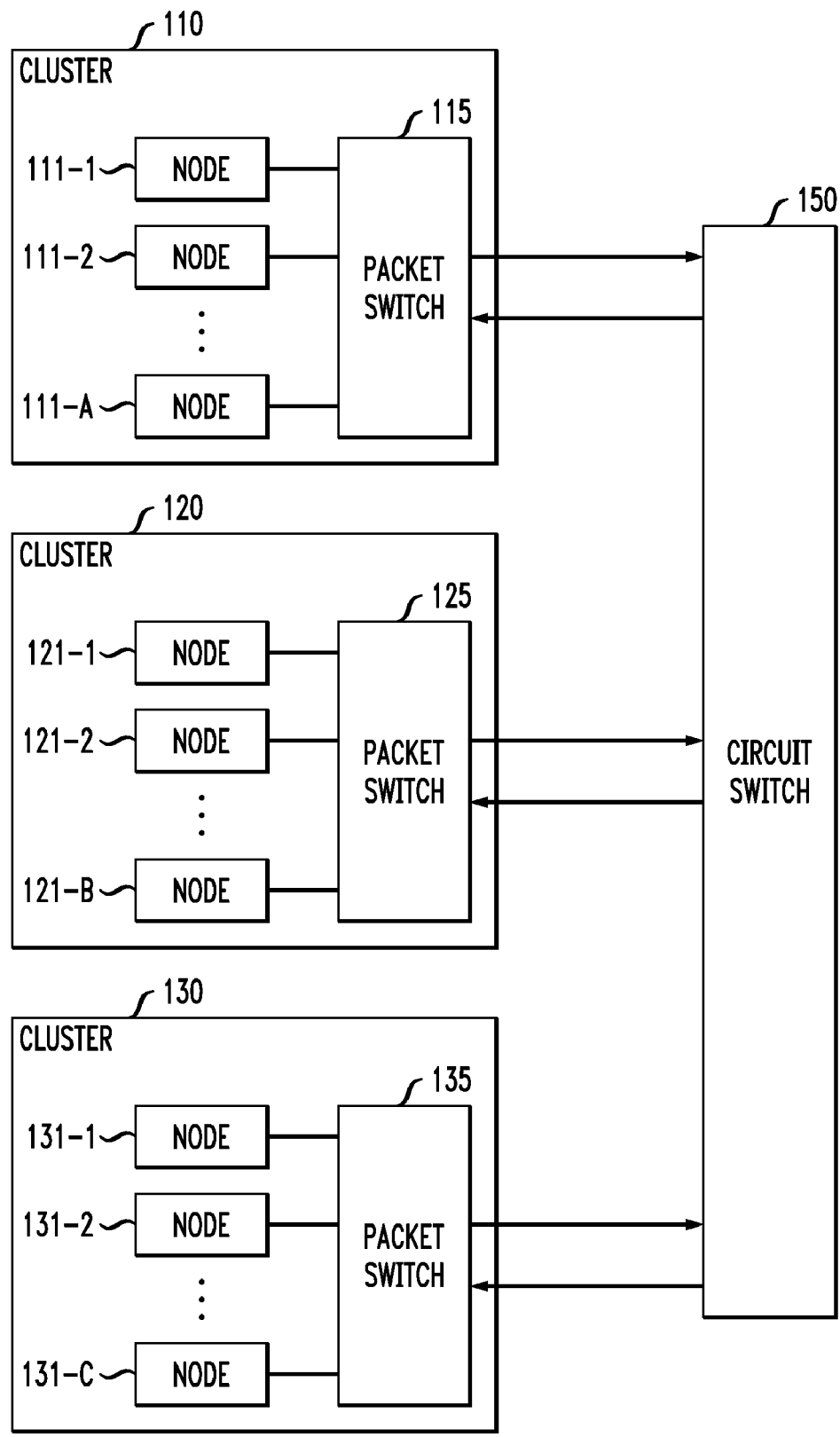
FIG. 1 is a schematic representation of an exemplary hardware configuration for a reconfigurable cluster network in accordance with an illustrative embodiment of the present invention.

FIG. 1 is a schematic representation of a hardware configuration for a reconfigurable cluster network in accordance with an illustrative embodiment of the present invention. As used herein, a cluster is defined as a group of nodes connected to a single packet switch. Cluster 110 comprises A nodes 111-1, 111-2, ... 111-A connected to packet switch 115. Cluster 120 comprises B nodes 121-1, 121-2, ... 121-B connected to packet switch 125. Cluster 130 comprises C nodes 131-1, 131-2, ... 131-C connected to packet switch 135.

Clusters 110, 120, and 130 are connected to circuit switch 150 through respective packet switches 115, 125 and 135. Each packet switch 115, 125 and 135 has internal ports that connect to each node in the same cluster and output ports that connect to circuit switch 150. Each packet switch 115, 125 and 135 connects to circuit switch 150 through the external ports, by one or more bidirectional connections.

Routing requests may be initiated between any nodes, in the same or a different cluster. Each packet switch is capable of forwarding packets between any two ports, internal to internal, internal to external, external to external, provided the destination nodes are reachable on the current topology. Circuit switch 150 is preferably able to dynamically reconfigure connections between the packet switches, thereby dynamically changing the network topology.

Each cluster 110, 120 and 130 may contain an equal number A, B and C of nodes 111, 121 and 131 or clusters may contain a different number of nodes. The number of nodes in each cluster is limited solely by the number of ports on packet switches 115, 125 and 135. Likewise, the number of clusters is limited only by the number of ports on circuit switch 150.

In an illustrative embodiment, circuit switch 150 may comprise an Optical Circuit Switch (OCS) and packet switches 115, 125 and 135 may comprise Electrical Packet Switches (EPS). Moreover, clusters 110, 120 and 130 may each be a multiple blade center chassis comprising multiple blades 111, 112 and 113 connected internally by respective EPS 115, 125 and 135, with EPS 115, 125 and 135 connected together with a reconfigurable OCS 150. Conventional aspects of a reconfigurable OCS suitable for use with an embodiment of the present invention are described in the aforementioned Barker paper.

Figure 2:
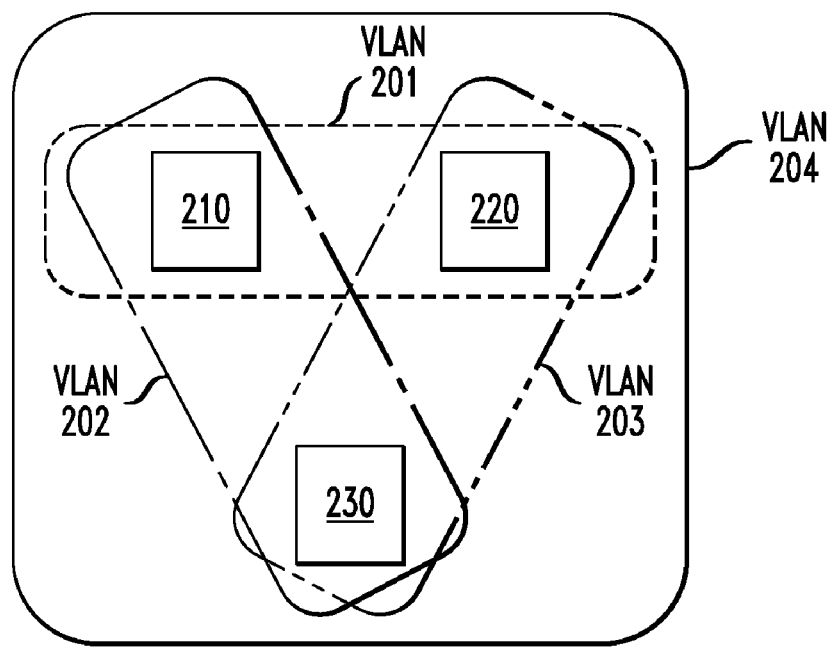
FIG. 2 is a schematic representation of an exemplary VLAN configuration in accordance with an illustrative embodiment of the present invention.

FIG. 2 shows an exemplary VLAN (virtual local area network) configuration of clusters in accordance with an illustrative embodiment of the present invention. Clusters 210, 220 and 230, each include nodes connected to an internal packet switch and may be similar to clusters 110, 120 and 130 in FIG. 1. VLAN 201 is set in common between clusters 210 and 220. VLAN 202 is set in common between clusters 210 and 230. VLAN 203 is set in common between clusters 220 and 230. VLAN 204 is set in common among clusters 210, 220 and 230. In other words, all nodes and ports in the packet switch for cluster 210 are members of VLANs 201, 202, and 204; all nodes and ports in the packet switch for cluster 220 are members of VLANs 201, 203, and 204; and all nodes and ports in the packet switch for cluster 230 are member of VLANs 202, 203, and 204.

In the preferred embodiment shown in FIG. 2, for every subset of clusters, a unique VLAN is set up for the subset that includes all of the ports in the packet switch and all of the directly connected nodes. In an alternate embodiment, VLANs may be set up only for some subsets of clusters. Each VLAN is exclusively used for communication between nodes contained within the VLAN that are accessible based on the configuration of the reconfigurable network switch. Topology reconfiguration by the network switch does not require VLAN changes.

VLAN setup can be done statically or dynamically. Where the setup of VLAN interfaces is static, each node is preferably initially set up with the maximum number of VLANs required to permit the nodes to always find the virtual interface to route to regardless of the VLAN memberships of the cluster the nodes are in. During the initial setup of VLANs across n clusters, if the maximum hop number for multi-hop routing is h (h hops requires a VLAN of size h+1 clusters), the maximum number of VLANs needed is $Cn^2+Cn^3+\ldots+Cn^{(h+1)}$. Each cluster will join the following number of VLANs: $Cn\text{-}1^1+Cn\text{-}1^2+\ldots+Cn\text{-}1^h$. Each node with a NIC should have one IP address for each VLAN it joins. The total number of IP addresses that are need when there are b nodes per cluster, n clusters and h hops is $(Cn\text{-}1^1+Cn\text{-}1^2+\ldots+Cn\text{-}1^h)\times b$.

VLAN configuration on each cluster node is preferably achieved by using the TCP/IP VLAN interface. TCP/IP supports VLANs by creating virtual interfaces over real interfaces. Each VLAN is assigned on a separate subnet and each virtual interface over all nodes for that VLAN will be assigned a unique IP address on that subnet. When sending any traffic to a VLAN via TCP/IP, it is only necessary to choose the virtual destination IP address assigned to that VLAN on the on the destination node—normal TCP/IP routing mechanisms then ensure that the desired path is taken. VLAN selection may be achieved by inserting a VLAN ID directly into the Ethernet frame.

In a preferred embodiment, the spanning tree algorithm is not enabled in order to minimize the time required to enable packets to flow again after the network is reconfigured. Instead, whenever there are multiple links connecting two clusters, the links are preferably trunked to avoid loops. Trunked links are treated as one link from the point of view of higher level network stacks, but provide more bandwidth. Link trunking is preferably performed accordingly when there are topology reconfigurations.

Inner-cluster routing is defined as routing between a source node and destination node in the same cluster. Preferably, for inner-cluster routing, a source node sends packets on any VLAN that the cluster is member of that only includes two clusters. Since all internal ports at the packet switch belong to the same VLANs, nodes on the same cluster can route to each other at Layer 2. For example, with reference to FIG. 2, if these nodes are in cluster 210, they can send packets via VLANs 201 or 202. Data is preferably not sent via VLAN 203 because there may be a potential loop in that VLAN if the spanning tree algorithm is not enabled.

Direct routing is defined as routing between a source node and destination node that are on different clusters, when the clusters are directly connected by a link in the reconfigurable network topology. Preferably, for direct routing, the source node sends data packets over the connected VLAN that is exclusively shared by the two clusters. Note that the connected exclusively-shared VLAN may differ depending on the topology of the reconfigurable network. Since this VLAN is only shared by the nodes on two clusters, the destination node is addressable at Layer 2. Even though there are multiple paths available in the topology, no loop exists inside this VLAN so no spanning tree group is needed.

Figure 3:
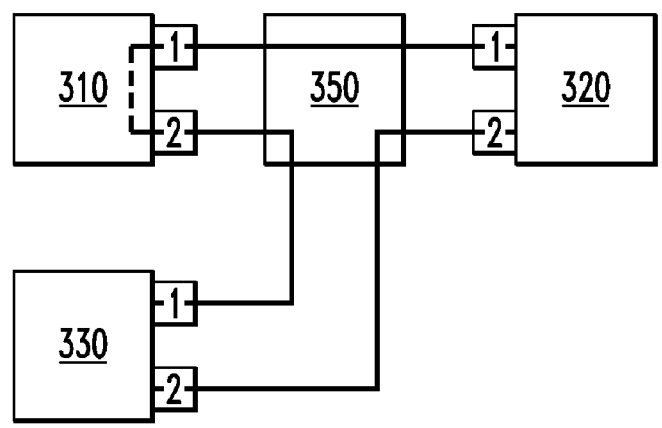
FIG. 3 shows exemplary direct routing in accordance with an illustrative embodiment of the present invention.

FIG. 3 shows exemplary routing in accordance with an illustrative embodiment of the present invention. Clusters 310, 320 and 330, which may be similar to clusters 110, 120 and 130 in FIG. 1, are connected to circuit switch 350, which may be similar to circuit switch 150 in FIG. 1. There are direct links connecting clusters 310 and 320, clusters 320 and 330, and clusters 310 and 330. Nodes between any two clusters can talk to each other by communicating over the respective direct links using the VLAN setup described in FIG. 2.

Without the VLANs, the spanning tree algorithm would need to run on the default LAN and disable one link in the loop. For example, if the direct link between clusters 320 and 330 were eliminated by the spanning tree algorithm, nodes in cluster 330 would be unable to reach nodes in cluster 320 through the direct link. Rather, the traffic would need to be routed via cluster 310 since the packet switch in cluster 310 can find both clusters 320 and 330. In that case, equivalent bandwidth between any two clusters would be reduced by half (assuming an equal distribution of bandwidth). Furthermore, if bridge priorities were not set on the packet switch, the link to be disabled would be random. It would thus become difficult for high performance programs to provision routes and network resources.

Multi-hop routing, which may be considered a generalized case of direct routing, is defined as routing between source nodes and destination node that are on different clusters, which are connected in the network topology only through intermediate clusters. A preferred embodiment of the present invention utilizes limited multiple path routing wherein, if there are more than one path available, either path may be chosen if no shorter path can be found within the set of clusters included in a given path. This condition implies that the set of clusters in one path should not be a subset of clusters in another path, i.e. each path should at least have one cluster different to the other.

Where this condition is not satisfied, only the shortest path that connects the two clusters should be used. The source node should sends data packets over the VLAN that is exclusively shared by the clusters and is also included in the shortest path. If there is no direct link between these two clusters, the shortest path will include at least one intermediate cluster.

In both methods, the chosen path is guaranteed to be loop-free in that VLAN because no shorter path could be found. In other words, the path to be routed is guaranteed loop-free by choosing an n-hop path if there is no path with n-1 hops available within the given set of clusters.

Figure 4:
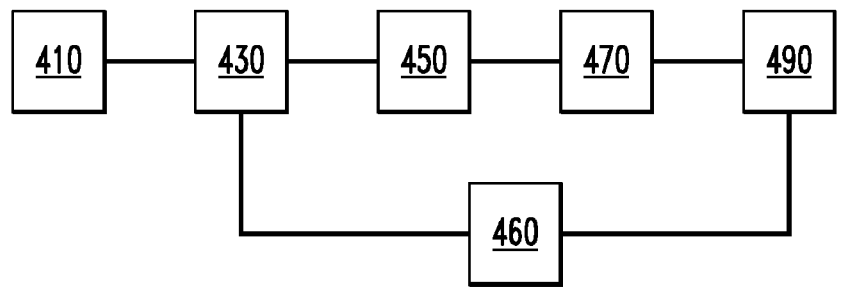
FIG. 4 shows exemplary multiple-path routing in accordance with an illustrative embodiment of the present invention.

FIG. 4 shows multiple-path routing within an exemplary VLAN in accordance with an illustrative embodiment of the present invention. Clusters 410 and 490 contain the source and the destination nodes, respectively. Two routes are available from 410 to 490. One is via the VLAN that exclusively includes clusters 410, 430, 450, 470, and 490. The other path is via the VLAN that exclusively includes clusters 410, 430, 460, and 490. Thus, the source node can send packets to either VLAN.

Figure 5:
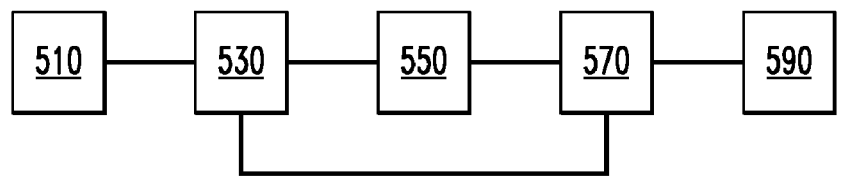
FIG. 5 shows exemplary multiple-hop routing in accordance with an illustrative embodiment of the present invention.

FIG. 5 shows multi-hop routing within an exemplary VLAN in accordance with an illustrative embodiment of the present invention. Clusters 510 and 590 contain the source and the destination nodes respectively. Here, however, there is not a multiple-path choice because the source node should not send the data over the longer path through clusters 510, 530, 550, 570, and 590 because that path is not loop free within the VLAN. Instead, the only path that should be used is 510, 530, 570 and 590.

An illustrative embodiment of the present invention maximizes topology flexibility, link usability and routing choices on Layer 2 routing. An illustrative embodiment may also minimize packet overhead and the reconfiguration cost of a dynamic topology. An illustrative embodiment of the present invention supports arbitrary network topology including loops and duplicate links and guarantees the availability of the topological shortest path or the existence of multiple paths. Multiple path routing may be available under certain conditions. In addition, in an illustrative embodiment of the present invention, the network reconfiguration time is substantially hastened by turning off the spanning tree protocol.

For switches that support standard TCP/IP protocols, no additional protocol or software installation may be needed on switches, nodes or Network Interface Cards, in an illustrative embodiment of the present invention. Rather, the only requirements for the implementation of an illustrative embodiment of the present invention are the ubiquitous services of ARP, VLANs, and optionally trunking, which are readily available on most standard settings.

Unlike simple Layer 2 routing, an illustrative embodiment of the present invention fully utilizes active links in the topology without being limited by the spanning tree algorithm. Unlike source routing variants, an illustrative embodiment of the present invention does not require each packet to carry with it the whole route. Unlike virtual circuit routing variants, an illustrative embodiment of the present invention does not require dynamic virtual circuit assignment after each topology reconfiguration. In an illustrative embodiment of the present invention, the initial VLAN setup can be totally static, supporting all kinds of topology changes, yet the VLAN configuration can also be extended as the network grows. In an illustrative embodiment of the present invention, trunking can be set up along with topological reconfiguration to increase the bandwidth on a particular VLAN.

Figure 6:
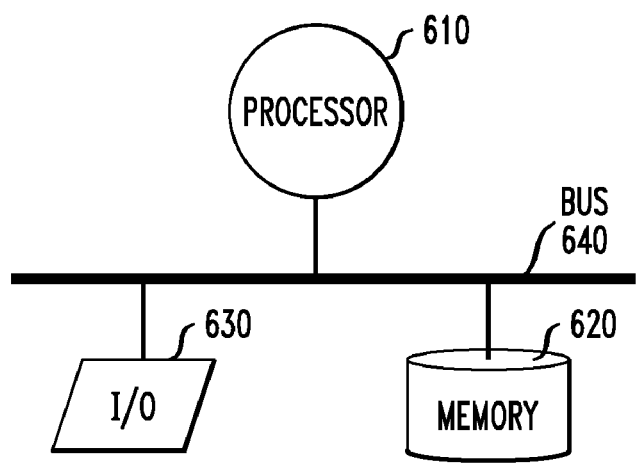
FIG. 6 is a block diagram depicting an exemplary processing system in which inventive techniques may be implemented.

The methodologies of embodiments of the invention may be particularly well-suited for use in an electronic device or alternative system. FIG. 6 is a block diagram depicting an exemplary processing system 600 formed in accordance with an aspect of the invention. In an illustrative embodiment, system 600 may represent a circuit switch (e.g., 150 in FIG. 1). System 600 may also represent a component of a cluster (e.g., 110, 120, 130 in FIG. 1), such as a packet switch (e.g., 115, 125, 135 in FIG. 1) and/or a node (e.g., 111, 121, 131 in FIG. 1). It is to be understood that system 600 may more generally represent any network component or other processing device known to one skilled in the art, e.g., a central and/or distributed controller.

System 600 may include a processor 610, memory 620 coupled to the processor (e.g., via a bus 640 or alternative connection means), as well as input/output (I/O) circuitry 630 operative to interface with the processor. The processor 610 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc.

Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor. I/O circuitry 630 may comprise, for example, one or more ports operative to receive and/or transmit one or more data packets and/or one or more control messages.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 610. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for routing at least one packet from at least one source node to at least one destination node, each node being operatively coupled to a given packet switch within a plurality of packet switches operatively coupled to a given circuit switch, the method comprising the steps of:

establishing a Virtual Local Area Network (VLAN) comprising multiple clusters and a circuit switch, wherein each cluster comprises a packet switch and one or more nodes operatively coupled to the packet switch via one or more corresponding internal ports on the packet switch, and wherein the packet switch of each cluster is operatively coupled to the circuit switch via one or more additional ports on the packet switch, and wherein the VLAN provides at least one route between the multiple clusters; and routing a packet from a source node in a first cluster to a destination node in a second cluster over a loop-free path within the VLAN, the path comprising a minimum number of nodes and/or a minimum number of switches, and wherein said routing comprises:

routing the packet from the source node in the first cluster to the packet switch in the first cluster via the corresponding internal port on the packet switch;

routing the packet from the packet switch in the first cluster to the circuit switch via one of the one or more additional ports on the packet switch;

dynamically reconfiguring, via the circuit switch, one or more connections between the packet switches in the VLAN to change network topology and route the packet from the circuit switch to the packet switch in the second cluster via one of the one or more additional ports on the packet switch; and routing the packet from the packet switch in the second cluster to the destination node in the second cluster via the corresponding internal port on the packet switch.

2. The method of claim 1, wherein the source and destination nodes are operatively coupled to a first packet switch within the plurality of packet switches.

3. The method of claim 2, wherein the packet is routed over the at least one path within a VLAN limited to the first packet switch and a second packet switch within the plurality of packet switches.

4. The method of claim 1, wherein the source and destination nodes are operatively coupled to respective first and second packet switches within the plurality of packet switches.

5. The method of claim 4, wherein the packet is routed over the at least one path within a VLAN limited to the first and second packet switches.

6. The method of claim 4, wherein the first packet switch and the second packet switch are connected directly via the circuit switch, and wherein the packet is routed over the at least one path within a VLAN limited to the first and second packet switches.

7. The method of claim 4, wherein the first packet switch and the second packet switch are connected only through at least a third packet switch, and wherein the at least one packet is routed over the at least one path within a VLAN limited to the first packet switch, the second packet switch, and the at least third packet switch.

8. The method of claim 1, wherein a VLAN is established for each subset of two or more packet switches within the plurality of packet switches operatively coupled to the given circuit switch.

9. The method of claim 1, wherein the packet is routed over at least one shortest path between the source and destination nodes.

10. The method of claim 1, wherein the at least one packet is routed over a plurality of paths connecting the source and destination nodes.

11. The method of claim 10, wherein the at least one packet is routed over a plurality of paths connecting the source and destination nodes responsive to a determination that each path within the plurality of paths comprises at least one packet switch not included in another path within the plurality of paths.

12. The method of claim 1, wherein the step of establishing at least one VLAN comprises the steps of:

assigning each VLAN to a separate subnet; and assigning a unique Internet Protocol address on the subnet assigned to a given VLAN to each virtual interface over the nodes for the given VLAN.

13. The method of claim 1, wherein the step of establishing at least one VLAN is performed without a spanning tree algorithm.

14. The method of claim 1, wherein the step of establishing comprises a step of establishing at least one trunk comprising a plurality of links between at least a given pair of packet switches.

15. The method of claim 1, wherein the step of establishing comprises a step of establishing at least one VLAN comprising a set of packet switches suitable to the number of hops through packet switches required for communication between the source and destination nodes.

16. The method of claim 1, wherein the given circuit switch is operative to dynamically reconfigure physical connections between the plurality of packet switches operatively coupled to the given circuit switch.

17. The method of claim 16, wherein the one or more VLANs remain static during the dynamic reconfiguration.

18. An apparatus for routing at least one packet from at least one source node to at least one destination node, each node being operatively coupled to a given packet switch within a plurality of packet switches operatively coupled to a given circuit switch, the apparatus comprising:
at least one memory;
at least one processor operatively coupled to the at least one memory, the processor operative to perform operations comprising:
establishing a Virtual Local Area Network (VLAN) comprising multiple clusters and a circuit switch, wherein each cluster comprises a packet switch and one or more nodes operatively coupled to the packet switch via one or more corresponding internal ports on the packet switch, and wherein the packet switch of each cluster is operatively coupled to the circuit switch via one or more additional ports on the packet switch, and wherein the VLAN provides at least one route between the multiple clusters; and
routing a packet from a source node in a first cluster to a destination node in a second cluster over a loop-free path within the VLAN, the path comprising a minimum number of nodes and/or a minimum number of switches, and wherein said routing comprises:
routing the packet from the source node in the first cluster to the packet switch in the first cluster via the corresponding internal port on the packet switch;
routing the packet from the packet switch in the first cluster to the circuit switch via one of the one or more additional ports on the packet switch;
dynamically reconfiguring, via the circuit switch, one or more connections between the packet switches in the VLAN to change network topology and route the packet from the circuit switch to the packet switch in the second cluster via one of the one or more additional ports on the packet switch; and
routing the packet from the packet switch in the second cluster to the destination node in the second cluster via the corresponding internal port on the packet switch.

19. The apparatus of claim 18, wherein the packet is routed over at least one shortest path between the first and second nodes.

20. The apparatus of claim 18, wherein the at least one packet is routed over a plurality of paths connecting the source and destination nodes responsive to a determination that each path within the plurality of paths comprises at least one packet switch not included in another path within the plurality of paths.

21. The apparatus of claim 18, wherein the operation of establishing comprises establishing at least one trunk comprising a plurality of links between at least a given pair of packet switches.

22. The apparatus of claim 18, wherein the operation of establishing comprises establishing at least one VLAN comprising a set of packet switches suitable to the number of hops through packet switches required for communication between the source and destination nodes.

23. A computer program product for routing at least one packet from at least one source node to at least one destination node, each node being operatively coupled to a given packet switch within a plurality of packet switches operatively coupled to a given circuit switch, the computer program product comprising a non-transitory computer usable storage medium having computer usable instructions tangibly embodied thereon which, when implemented, cause a computer to carry out a plurality of method steps comprising:
establishing a Virtual Local Area Network (VLAN) comprising multiple clusters and a circuit switch, wherein each cluster comprises a packet switch and one or more nodes operatively coupled to the packet switch via one or more corresponding internal ports on the packet switch, and wherein the packet switch of each cluster is operatively coupled to the circuit switch via one or more additional ports on the packet switch, and wherein the VLAN provides at least one route between the multiple clusters; and
routing a packet from a source node in a first cluster to a destination node in a second cluster over a loop-free path within the VLAN, the path comprising a minimum number of nodes and/or a minimum number of switches, and wherein said routing comprises:
routing the packet from the source node in the first cluster to the packet switch in the first cluster via the corresponding internal port on the packet switch;
routing the packet from the packet switch in the first cluster to the circuit switch via one of the one or more additional ports on the packet switch;
dynamically reconfiguring, via the circuit switch, one or more connections between the packet switches in the VLAN to change network topology and route the packet from the circuit switch to the packet switch in the second cluster via one of the one or more additional ports on the packet switch; and
routing the packet from the packet switch in the second cluster to the destination node in the second cluster via the corresponding internal port on the packet switch.

24. The method of claim 1, wherein the given circuit switch is an Optical Circuit Switch (OCS).

25. The method of claim 24, wherein the given packet switch is an Electronic Packet Switch (EPS).

* * * * *